May 30, 1961 D. W. MOORE 2,986,368
VALVE
Filed July 24, 1958

INVENTOR
D. W. MOORE
BY: Maybee Legris
ATTORNEYS

United States Patent Office 2,986,368
Patented May 30, 1961

2,986,368
VALVE
Derek Wilbur Moore, Toronto, Ontario, Canada, assignor to Orenda Engines Limited, Malton Village, Ontario, Canada, a corporation Filed July 24, 1958, Ser. No. 750,745
6 Claims. (Cl. 251—30)

This invention relates to control means for hydraulic valves and in particular to control means for a hydraulic valve which will enable the valve to either open or close gradually over a predetermined time interval.

Sudden pressure changes frequently occur in fluid circuits and their occurrence causes undesirable effects in many instances. In the fuel line of a gas turbine engine, for example, sudden pressure changes may result in compressor surge which can cause considerable damage to an engine.

To avoid sudden pressure changes it becomes necessary to provide fluid circuits with means for absorbing or eliminating such surges. Spring loaded valves and accumulators are in common use for this purpose but serve only to absorb the pressure change after it occurs and are unable to prevent its occurrence.

Sudden pressure changes when a valve in a hydraulic system is opened or closed could be prevented to a large extent if the valve were provided with means to control its rate of opening and closing thereby permitting a gradual pressure change. Such a valve might be mechanically controlled by an external device but this would require the use of an additional mechanism which would, by itself, require control.

A preferable solution would be the provision of a control means for a hydraulic valve which, by the nature of its construction, would inherently open or close slowly, preferably at a predetermined rate which may be adjusted. Such a system is provided by the present invention in which a comparison between the outlet pressure of the valve and a reference pressure is used to operate a valve. The reference pressure is made to follow a predetermined fixed relationship with time and, accordingly, by causing the outlet pressure to follow the pressure change in the reference pressure, a valve is provided which opens and closes at a predetermined rate. The comparison between the outlet pressure and the reference pressure is made by means of a piston which is subjected to outlet pressure on one side and the reference pressure on the other side, the piston mechanically opening and controlling the valve which controls the flow of fluid through the device.

In an alternative embodiment of the invention the reference pressure and the outlet pressure act on pistons of different areas so that the reference pressure may be effectively multiplied and, accordingly, the actuation of the valve is controlled by only a relatively small portion of the reference pressure range and, as a result, only the desired portion of pressure variation in the reference pressure may be selected to control the valve operation.

The invention is described with reference to a preferred embodiment of construction illustrating the invention which is disclosed in the accompanying drawings in which like reference numerals denote like parts in the various views and in which.

Figure 1:
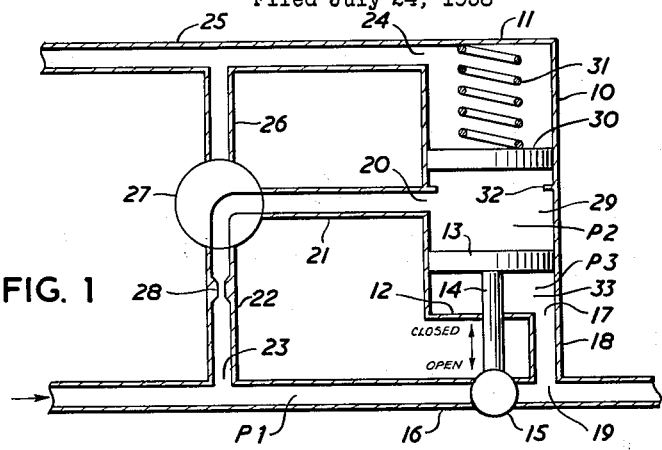
Figure 1 is a schematic view of a hydraulic system embodying the invention.

Referring now to Figure 1 a cylinder 10 may be seen which is provided with an end wall 11 at one end and, at the other end, a second end wall 12. A piston 13 is provided in the cylinder and carries a piston rod 14 which extends through end wall 12 and which, at the end externally of the cylinder 10 is mechanically connected to a valve 15 for controlling the flow of fluid through the line 16.

End wall 12 of cylinder 10 is, in addition, provided with a port 17 which is connected, by means of a first conduit 18 with the line 16 downstream from the valve 15 at point 19. A second port 20 is provided in cylinder 10 on that side of piston 13 remote from the first conduit 18 and this port 20 is connected, by means of lines 21 and 22 to the line 16 upstream from the valve 15 at point 23.

A third port 24 is provided adjacent end wall 11 of the cylinder 10 which port is connected, by means of line 25 to a source of pressure lower than that in the line 16 upstream from the valve 15. This line 25 may be connected in communication with port 20 by means of conduit 26 through a three-way two-position valve 27 which, in the position shown in Figure 1, connects conduit 21 with conduit 22 and, hence, port 20 with line 16.

A flow restricting orifice 28 is shown, in Figure 1, as being positioned in line 22 but, as will later appear, it may, in certain circumstances, be placed in either line 21 or line 26.

Having described the general construction of the schematic system shown in Figure 1 the function of this arrangement will now be described.

High pressure fluid from a pump (not shown) enters fluid inlet conduit 16 in the direction of the arrow when either the pump is set in operation or, alternatively, when a master control valve somewhere upstream in line 16 is opened. This high pressure fluid will exert a pressure on line 16 shown in Figure 1 which will be termed P1 as may be seen in the drawing. Let it also be assumed for the present purpose of description that valve 15 is in the closed position. Let it also be assumed that the line 16 downstream from valve 15 leads to a device such as a fuel nozzle in a gas turbine engine and that, accordingly, the pressure in line 16 downstream from the valve 15 is, when valve 15 is closed, substantially lower than that in the line 16 upstream from the valve 15. Since valve 15 is closed fluid may not flow through the valve 15 in line 16 and, accordingly, a pressure P1 is retained upstream of the valve. Through conduit 22, orifice 28, three-way two-position valve 27 which, for the purposes of the present description, may be considered to be in the position shown in Figure 1, and conduit 21, fluid will flow into chamber 29 above piston 13 in the drawing. The fluid flowing through the flow restricting orifice 28 will experience a pressure drop as it does so and, accordingly, the pressure in chamber 29 will be lower than pressure P1 and this pressure is indicated as pressure P2, it being understood that pressure P2 at this time is less than pressure P1.

As P2 in chamber 29 rises, a second floating piston 30 which is spring biased by means of a compression coil spring 31 towards a stop 32 will begin to move away from piston 13 and will continue to do so until the pressure P2 in the chamber 29 is sufficient to overcome any forces restraining the movement of piston 13 which will then move down in Figure 1 to open the valve 15. As valve 15 opens, pressure in chamber 33 will rise and exert, on that face of piston 13 opposite to chamber 29, a force tending to restrain the downward movement of the piston and, accordingly, to restrain the opening of the valve 15. Accordingly, as soon as valve 15 opens very slightly a pressure in chamber 33 will begin to develop which will restrain the tendency of the piston 13 to open the valve further and this restraining influence will slow down the movement of piston 13 and prevent valve 15 from being opened almost instantaneously. Pressure in chamber 29 will continue to build up until ultimately it equals the pressure P1 in line 16. By this time the valve 15 will be fully opened since the pressure P3 in chamber 33 firstly can never equal the pressure P1 in line 16 since the fluid will experience a pressure drop while passing through the valve 15 and, secondly, the area of piston 13 adjacent chamber 33 is less than the area of piston 13 adjacent chamber 29 due to the presence of piston rod 14. Accordingly a state of equilibrium will ultimately be reached with the valve 15 fully opened, a pressure in chamber 29 equal to pressure P1 in line 16 and with a pressure P3 in chamber 33 somewhat below P1 in line 16 and, accordingly, a flow of fluid through the line 16 will be established. In order to stop the flow of fluid through the line and to close valve 15 it is merely necessary to move the two-position three-way valve 27 to connect conduit 21 with conduit 26 which would suddenly dump the fluid in chamber 29 into line 25 thereby suddenly making pressure P3 greater than pressure P2 and, accordingly, snapping the valve 15 closed as quickly as fluid could be forced from chamber 29 through conduit 21, valve 27, conduit 26 into line 25.

From the last sentence above, it will be apparent that if it is desired to produce a valve which will close slowly rather than open slowly it is necessary to move the flow restricting orifice 28 from its present position in line 22 to a new position in line 26. If this is done and pressure P1 exists in line 16 then as soon as the three-way two-position valve 27 is moved to the position shown in Figure 1 a pressure equal to P1 will immediately be built up in chamber 29 which would suddenly snap the valve 15 open due to the immediate downward movement of piston 13. As soon as the two-position three-way valve 27 was then moved to connect conduits 21 and 26 the pressure P3 would cause piston 13 to move up as quickly as fluid could be forced through a flow restricting orifice placed in line 26. This, of course, would slow down the travel of piston 13 and, accordingly, a valve would be produced which would close slowly.

It may now also be seen that if it is desired to produce a control system for valve 15 which will enable the valve to both open slowly and close slowly it is necessary to move the flow restricting orifice 28 from the conduit 22 to the conduit 21 where it will influence the pressure of fluid flowing through it both into the chamber 29 and out of this chamber.

The line 25 is connected to the cylinder 10 above piston 30 through port 24 solely for the purpose of providing an escape for any fluid in this portion of the cylinder 10 which may leak past the piston 30. Similarly the stop 32 is provided in the cylinder 10 to limit the downward movement of piston 30 so that it will not close off or restrict port 20 communicating with conduit 21.

It will also be apparent to one skilled in the art that under normal operating conditions all the chambers and conduits within the valve will normally be full of fluid and there will be no air bubbles present. Accordingly, P2 will gradually rise from its dormant pressure to the operating pressure which, ultimately, will equal pressure P1. Similarly, chamber 33, conduit 18 and line 16 downstream from the valve 15 will also be full of fluid and, accordingly, there will be no time lag during which these areas fill up with fluid but the pressure transmission will be instantaneous due to the presence of fluid therein.

Having described the general principle of the invention in relation to a schematic diagram reference will now be made to Figures 2 and 3 which illustrate one form which the invention may take.

Figure 2:
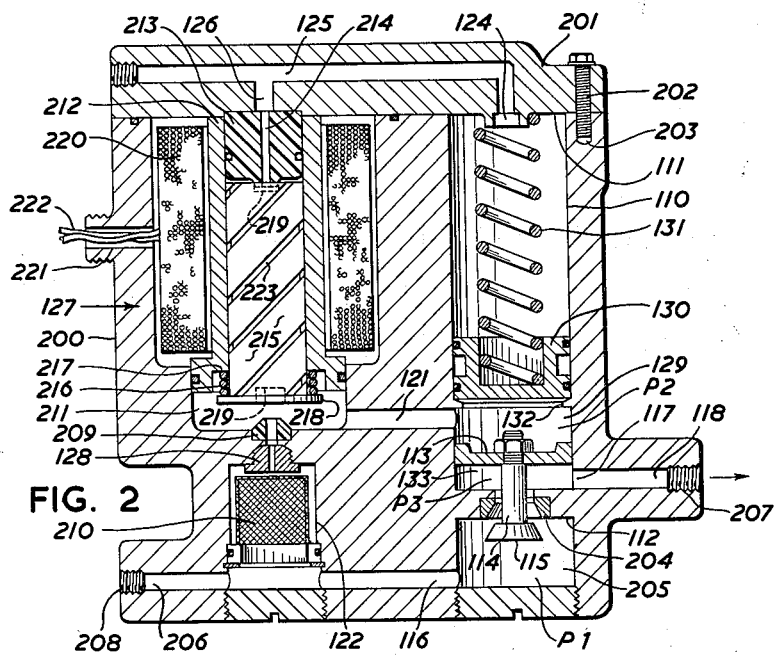
Figure 2 is a cross-sectional view of the device of Figure 1 embodied in a practical unitary valve assembly.
Figure 3:
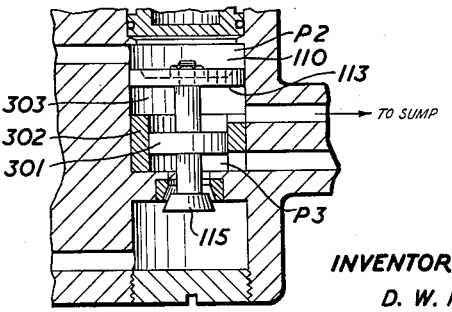
Figure 3 is a cross-sectional view of a portion of Figure 2 showing an alternative construction.

In Figure 2 parts corresponding to those parts shown schematically in Figure 1 will be given the same reference numerals with the numeral 1 placed before them. Accordingly, chamber 29 in Figure 2 will be indicated by reference character 129 and those parts in Figure 2 which do not have any counterpart in the schematic drawing Figure 1 will be indicated by reference characters within the range of from 200 to 299. In Figure 3 parts corresponding to those parts shown in Figure 2 will bear the same reference numerals but those parts having no counterpart in Figure 2 will bear reference numerals within the range of from 300 to 399.

Referring now to Figure 2 the valve may be seen to be embodied in a casing 200 which may be formed from a substantially solid block by suitable machining practices. It will be seen that the body 200 is provided, at the upper end (as seen in Figure 2) with an end plate 201 which is secured to the body 200 by means such as bolts 202 which are received in threaded apertures 203 at suitably placed points in the body 200.

Body 200 is provided with a first cylindrical chamber 110 corresponding to cylinder 10 in Figure 1 which, at one end, is closed by end plate 201 constituting an end wall 111 for the cylinder, and at the other end, by means of a partition constituting end wall 112 for the cylinder 110. This partition 112 carries a valve seat 204 which is engaged by valve 115 carried by piston rod 114 which, in turn, carries a first piston 113 mounted for sliding movement in cylinder 110. A port 117 is provided in cylinder 110 in communication with a conduit 118 through which fluid may pass out of the valve assembly. A second cylindrical chamber 205 is provided surrounding the valve seat 204 and the valve 115 and this chamber 205 is in communication with port 206 which leads to a drilling constituting a fluid inlet line 116 of the valve. Each of conduits 118 and 116 is provided with a conventional coupling portion 207 and 208 to which suitable fluid conduits may be secured.

Also slidable in cylinder 110 is a second piston 130 which is spring biased by means of a compression coil spring 131 towards a stop 132 formed on the inner surface of cylinder 110. That portion of cylinder 110 above piston 130 is provided with a port 124 which is in communication with a line 125 which leads to a source of pressure below that occurring in line 116. Line 125 recited in the claims as a fluid sump passage, in practice, will lead to a fluid sump (not shown) which, as in all aircraft hydraulic systems will be pressurized above atmospheric pressure but at a pressure much lower than pump delivery pressure from the sump.

Chamber 129 is in communication with line 116 upstream from the valve 115 by means of a drilling 121 recited in the claims as a second fluid control passage, a valve seat 209, a flow restricting orifice 128, a filter 210 which lies in an enlarged chamber or conduit 122 recited in the claims as a first fluid control passage.

Intermediate drilling 121 and the valve seat 209 is an enlarged third cylindrical chamber indicated generally by reference character 211 which contains one form which the two-position three-way valve 127 may take. This chamber 211, at its upper end, is also in communication with line 125 through a drilling 126 recited in the claims as a third control passage.

Within the generally cylindrical chamber 211 there is positioned firstly, a cylindrical sleeve 212 of non-magnetic material which, at its upper end, surrounds the end of drilling 126 and bears against the lower face of end plate 201 to form a seal thereagainst thereby extending drilling 126 downwardly into chamber 211. Within the cylindrical sleeve 212, adjacent the upper end thereof, is a plug 213 which is provided with a central drilling 214 and which, at its lower end, is formed with a frusto-conical valve seat surrounding drilling 214.

Slidable within the non-magnetic sleeve 212 is a cylindrical magnetic armature 215 which is urged, by means of a compression spring 216 bearing, at one end, against a shoulder 217 on the sleeve 212 and, at the other end, against a flange 218 extending radially outwardly from the lower end of armature 215 in a downward direction against valve seat element 209. Each end of the armature 215 is provided with a resilient plug 219 inserted in a recess so that when the armature is in either its uppermost or lowermost position this resilient plug will bear against the frusto-conical valve seat element and form an efficient seal.

Externally of the non-magnetic cylindrical sleeve 212 is an electrical winding 220 forming a solenoid with the armature 215, the coil 220 having external electrical connections through an opening 221 in the wall of the body 200 by means of conduits 222.

Having described the construction of the preferred embodiment shown in Figure 2 its operation will be briefly described and compared with the operation described with reference to Figure 1.

The valve shown in Figure 2 receives fluid from the high pressure source through port 206 and, accordingly, transmits fluid under pressure P1 by means of line 116 into chamber 205 where pressure P1 will exist. In addition, fluid will pass through filter 210, orifice 128, valve seat 209 (when the armature 215 is in the position shown in Figure 2) and thence into chamber 211, through drilling 121 into chamber 129 where, due to its passage through orifice 128, a pressure P2 will exist where P2 is less than P1. P2 will rise with the lapse of time until P2 is sufficient to move piston 113 downwardly to move valve 115 off valve seat 204 and to admit fluid to chamber 133 beneath piston 113. The pressure in chamber 133 will be represented by P3 which will be less than P1 and which, in addition, will be less than P2. If pressure P3 were to exceed pressure P2 as, for example, by a sudden over-opening of valve 115, the pressure on the underside of piston 113 would tend to move it upwardly to close valve 115 thereby reducing pressure P3 to a point below pressure P2. As pressure P2 builds up in chamber 129 piston 130 will, of course, move away from piston 113 against the influence of spring 131 until pressure P2 equals pressure P1 due to the pressure of spring 131 equalling pressure P1. At this point no further flow of fluid may take place through the orifice 128 and the valve 115 will, accordingly, be completely opened and a flow path through the valve will be established through chamber 205, past valve 115 into chamber 133 and out through conduit 118.

In order that armature 215 be in the position shown in Figure 2 it is necessary that the solenoid 220 be energized. To this end an electrical current is passed through the solenoid windings through conduits 222 from a suitable source (not shown) and armature 215 is moved in a vertically upward direction (as seen in Figure 2) so that resilient plug 219 is in engagement with the frusto-conical valve seat surrounding drilling 214 in plug 213. As a result, fluid may not escape from chamber 211 or from chamber 129 and the open condition of the valve 115 will be sustained.

In the event that it is desired to close valve 115 at the electrical circuit energizing solenoid windings 220 will be broken and, accordingly, armature 215 will move downwardly under the influence of coil spring 216 to break the communication between conduit 122 and 121 and to establish communication between chamber 129 and conduit 121 and conduit 126 through a series of spiral grooves 223 cut in the external surface of the armature 215. Thus, fluid may escape from the chamber 129 into conduit 125 through passage 121, chamber 211, spiral grooves 223 and drilling 214, conduit 126 and into conduit 125 thereby reducing P2 to below that of P3 so that piston 113 will move upwardly as seen in Figure 2 to close valve 115.

As was described with reference to Figure 1 the flow restricting orifice 128 might be mounted in the position occupied by plug 213 in which case the valve 115 would close slowly due to the fact that flow of fluid from chamber 129 to permit the upward movement of piston 113 would be restricted thereby slowing down the movement of the piston in this direction. Similarly, placement of a flow restricting orifice 128 in conduit 121 would produce the effect of a slow opening and a slow closing valve 115.

Since the flow characteristics through the flow restricting orifice 128 will not follow a linear relationship with time but the flow will tend to reduce as P2 approaches P1 the movement of the piston 113 and valve 115 will not be at a constant rate. If it is desired that it be at a constant rate it is possible to multiply the effective pressure at P2 so that the movement of the piston 113 will take place during a shorter period of time and during a time when the rise of P2 follows a linear relationship with time. The means for accomplishing this is shown in Figure 3 wherein piston 113 is supplemented by a secondary smaller piston 301 lying intermediate piston 113 and valve 115. The smaller piston 301 slides in a portion 302 of reduced diameter in cylinder 110 and the presence of piston 301 provides an additional chamber 303 between piston 113 and piston 301. Since, in Figure 3, pressure P3 may act upon only the smaller area of piston 301 whereas pressure P2 acts upon the much larger area of piston 113 it will be seen that the valve 115 will move to its fully open position in less time than will be required by the equivalent construction shown in Figure 2. In addition this movement will take place during the initial portion of the pressure rise of P2 and, accordingly, the movement of piston 113 and valve 115 will follow a relationship with time which is closer to a linear relationship than that of the device shown in Figure 2.

The flow restricting orifice 128 will be seen to be in threaded engagement with the body 200 of the valve and, accordingly, is removable and exchangeable with other orifices of smaller or larger diameter. As a result, the time interval between initial energization of solenoid winding 220 and the full opening of the valve 115 may be varied at will.

Having described the invention in principle with respect to a schematic drawing having illustrated a preferred embodiment which the invention may take it is believed that it will be seen that control means for a hydraulic valve has been provided which will enable the valve to either open or close slowly, following a predetermined relationship with time and means have been provided whereby both a slow opening and slow closing may be achieved. No external control means are provided, the slow opening and closing characteristics of the valve being inherent in its construction and being achieved by comparing the outlet pressure of the valve with a reference pressure derived from the inlet pressure of the valve and compared across a movable piston which actuates the valve mechanism.

The invention has been described in detail with reference to a specific embodiment which is intended to be illustrative only, the scope of the invention being defined in the appended claims.

What I claim as my invention is:
1. A valve for regulating the flow of fluid in a line comprising a valve body, a first cylindrical chamber in the valve body, a second cylindrical chamber in the valve body coaxial with the first cylindrical chamber and separated therefrom by a partition which is provided with a central aperture constituting a valve seat and defining a flow passage, a first piston in the first chamber and a valve element in the second chamber, the first piston and the valve element being connected by a piston rod so that movement of the first piston in the first chamber causes actuation of the valve element in relation to the valve seat in the second chamber, a second piston in the first chamber spring biassed towards the first piston and located by a stop out of contact with the first piston at the limit of its travel towards the first piston, a fluid inlet passage com- municating with the second chamber, a fluid outlet passage communicating with the first chamber between the first piston and the partition, a third cylindrical chamber in the valve body, a first fluid control passage communicating with the third cylindrical chamber from the fluid inlet passage, a second fluid control passage constantly communicating with the third cylindrical chamber and the first cylindrical chamber between the first piston and the second piston and a fluid sump passage constantly communicating with the first cylindrical chamber on that side of the second piston remote from the first piston, and an external sump, a third fluid control passage communicating between the third cylindrical chamber and the sump passage, and means within the third cylindrical chamber reciprocable along the axis of the third cylindrical chamber to close the third fluid control passage communicating between the third cylindrical chamber and the sump passage and open the first fluid control passage communicating with the third cylindrical chamber from the fluid inlet passage in one position and, in its other position, to close the first fluid control passage communicating with the third cylindrical chamber from the fluid inlet passage and to open the third fluid control passage communicating between the third cylindrical chamber and the sump passage and a flow restricting orifice in the first fluid control passage between the fluid inlet and the third cylindrical chamber.

2. A valve as claimed in claim 1 in which the means reciprocable along the axis of the third cylindrical chamber is the armature of an electrical solenoid, the windings of which are positioned within the third cylindrical chamber but sealed from contact with the fluid by means of a cylindrical sleeve within which the armature may reciprocate.

3. A valve as claimed in claim 2 in which the armature is spring biassed into one of its two positions.

4. A valve as claimed in 2 in which the electrical winding actuating the armature is controlled from a point remote from the valve.

5. A valve as claimed in claim 2 in which, in the fluid passage communicating between the fluid inlet passage and the third cylindrical chamber there is provided a fluid filter.

6. A valve as claimed in claim 1 in which both the first fluid control passage communicating between the fluid inlet passage and the third cylindrical chamber and the third fluid control passage communicating with the third cylindrical chamber and the sump passage enter the third cylindrical chamber through ports which are concentric with the circular end walls of the third cylindrical chamber and which ports constitute valve seats against which the reciprocable means may seat to open one and close the other of the two respective fluid control passages.

References Cited in the file of this patent

UNITED STATES PATENTS

| | | |
|---|---|---|
| 1,846,483 | Gilbert | Feb. 23, 1932 |
| 2,588,202 | Breit | Mar. 4, 1952 |
| 2,708,091 | Ho Yun Rim | May 10, 1955 |